United States Patent
Raza et al.

(10) Patent No.: US 10,419,211 B1
(45) Date of Patent: Sep. 17, 2019

(54) HASH-BASED KEY DISTRIBUTION

(71) Applicant: Cisco Technology, Inc., San Jose, CA (US)

(72) Inventors: Syed Khalid Raza, Fremont, CA (US); Praveen Raju Kariyanahalli, San Ramon, CA (US); Venugopal Hemige, San Ramon, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 199 days.

(21) Appl. No.: 14/953,431

(22) Filed: Nov. 30, 2015

(51) Int. Cl.
*H04L 29/06* (2006.01)
*H04L 9/08* (2006.01)

(52) U.S. Cl.
CPC ............ *H04L 9/083* (2013.01); *H04L 9/0861* (2013.01); *H04L 63/0428* (2013.01)

(58) Field of Classification Search
CPC .................................. H04L 12/00; G06F 9/00
See application file for complete search history.

(56) References Cited

U.S. PATENT DOCUMENTS

| | | | | |
|---|---|---|---|---|
| 7,649,998 B2* | 1/2010 | Harran | ............... | H04L 63/0428 380/261 |
| 8,983,066 B2* | 3/2015 | Kruys | ................. | H04L 9/0833 380/44 |
| 9,674,892 B1* | 6/2017 | Li | ....................... | H04W 88/08 |
| 2008/0144835 A1* | 6/2008 | Roy | ................... | H04L 63/1433 380/278 |
| 2010/0318800 A1* | 12/2010 | Simon | ............... | H04L 63/0428 713/171 |

* cited by examiner

*Primary Examiner* — Joseph P Hirl
*Assistant Examiner* — Leynna T Truvan
(74) *Attorney, Agent, or Firm* — Polsinelli PC

(57) ABSTRACT

A method for securing communications for a given network is provided. The method comprises by at least one node(i) of the network configured to utilize pairwise keys: generating a set of encryption keys; and transmitting the set of encryption keys to a controller for the network; by the controller, executing a key selection process wherein for each node(j) in the network an encryption key J is selected from the set of encryption keys; assigning the encryption key J to the node(j); and transmitting the selected encryption key J to the node(j); by each node(j), generating an encryption key I for the node(i); and sending the encryption key I to the node(i) via the controller.

18 Claims, 5 Drawing Sheets

| Node/Edge | Tloc | Encryption Key Type | Key Database |
|---|---|---|---|
| E1 | T1 | pairwise | k(a) for node E2<br>k(b) for node E3<br>k(c) for node E4 |
| E2 | T2 | unidirectional | k(x) for node E1<br>k(2) for all other nodes |
| E3 | T3 | unidirectional | k(y) for node E1<br>k(3) for all other nodes |
| E4 | T4 | unidirectional | k(z) for node E1<br>k(4) for all other nodes |

*FIG. 2*

HASH-BASED KEY DISTRIBUTION

FIELD

Embodiments of the present invention relate to methods and systems for creating and operating secure wide area networks

BACKGROUND

Co-pending U.S. patent application Ser. No. 13/754,866 entitled "Method and System for Key Generation, Distribution, and Management", which is hereby incorporated herein by reference in its entirety describes the use of unidirectional encryption keys where each node in a network generates a receive key which is advertised to a central controller for the network over a secure control channel. Said controller in turn is configured to advertise the receive key to all other nodes in the domain.

In case of unidirectional keys, each node uses the same key to encrypt traffic to a given node. However, there are cases where, for the sake of increased security, there is a requirement for pair-wise keys between certain nodes.

SUMMARY

According to one aspect of the invention, there is provided a method for securing communications for a given network. The method comprises by at least one node(i) of the network configured to utilize pairwise keys: generating a set of encryption keys; and transmitting the set of encryption keys to a controller for the network; by the controller, executing a key selection process wherein for each node(j) in the network an encryption key J is selected from the set of encryption keys; assigning the encryption key J to the node(j); and transmitting the selected encryption key J to the node(j); by each node(j), generating an encryption key I for the node(i); and sending the encryption key I to the node(i) via the controller.

Other aspects of the invention will be apparent from the detailed description below.

BRIEF DESCRIPTION OF THE FIGURES

FIG. 2 shows a Table with some of the attributes of the nodes in the network of FIG. 1.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block or flow diagram form only in order to avoid obscuring the invention. Accommodate Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to the details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Broadly, embodiments of the present invention disclose a mechanism for generating, distributing and managing pairwise keys for secure communications between nodes in a network. As used herein the term "pairwise keys" refers to a key pair comprising a first key and a second key. The first key is used for encrypting communications from a first node in the network to a second node, whereas the second key is used by the second node to encrypt communications to the first node.

Figure 1:
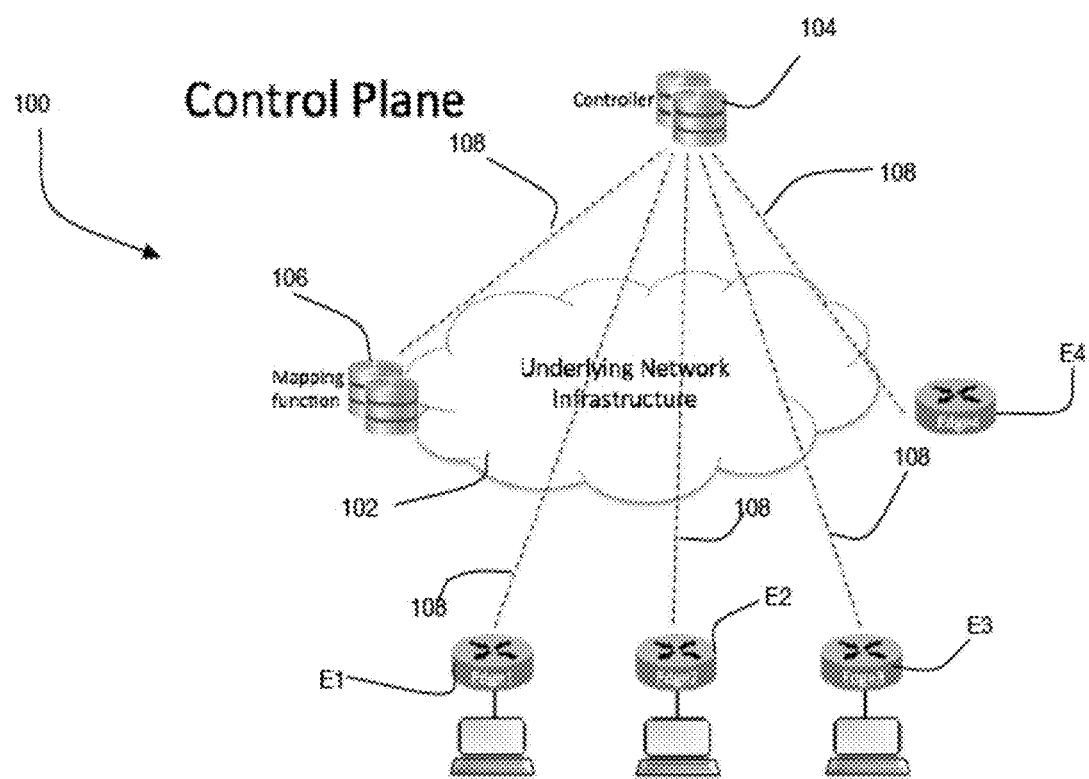
FIG. 1 shows a network 100 with a control plane, in accordance with one embodiment of the invention.

FIG. 1 shows a representative network 100 in accordance with one embodiment of the invention. Referring to FIG. 1, reference numeral 102 indicates underlying network infrastructure that may be used to connect endpoints/edges E1 to En together. In one embodiment, the endpoints/edges may represent branch office routers. In FIG. 1 only four edges are shown and are indicated as edges E1 to E4, respectively. However, it is to be understood that many more edges are possible in accordance with different embodiments.

The underlying network infrastructure 102 forms a transport network and may include elements that form a Wide Area Network (WAN) and in some embodiments may include public and/or private infrastructure. For example, in one embodiment the underlying network infrastructure 102 may include the public Internet.

In one embodiment, the network 100 may be configured to support a control plane, which is established to all endpoints in the network. Techniques for establishing the control plane based on an overlay management protocol are described in co-pending U.S. patent application Ser. No. 14/133,558 entitled "OVERLAY MANAGEMENT PROTOCOL FOR SECURE ROUTING BASED ON AN OVERLAY NETWORK" which is incorporated herein by reference in its entirety. The control plane serves as a distribution vehicle for control information. In one embodiment, to facilitate the establishment of said control plane, the network 100 further comprises a controller 104 and a mapping server 106. The mapping server 106 supports a bring up method used to establish the control plane as is described in co-pending U.S. patent application Ser. No.

14/028,518 entitled "SECURE BRING-UP OF NETWORK DEVICES" which is incorporated herein by reference in its entirety. In one embodiment, the control plane is defined by secure control channels 108 between the controller 104 and the various edges in the network 100, and the between the controller 104 and the mapping server 106. In one embodiment, the channels 108 may comprise DTLS links.

Each of the nodes E1 to En has an address or location within the network 102. This address is referred to as a transport location or "TLOC". In one embodiment, routing within the network 102 may be based on TLOCs through use of an overlay management protocol as is described in co-pending U.S. patent application Ser. No. 14/133,558. Further, each of the nodes E1 to En may be provisioned with a unidirectional key or a pairwise key depending a key-type associated therewith, as will be explained.

For purposes of discussion, consider Table 200 shown in FIG. 2, which shows the parameters associated with each of the nodes E1 to En in the network 102. As will be seen, the encryption key type for the node E1 is set to pairwise, whereas the encryption key type for the remaining nodes E2 to E4 is set to unidirectional. In one embodiment, to specify the encryption key type for each node, "security parameters" are extended to include an attribute of a node (TLOC) that specifies the type of keys it prefers to use with any other node that desires to communicate with it. This attribute is referred to as "encryption-key-type" for ease of reference and may be set to "unidirectional" or "pairwise". In one embodiment, its default value is "unidirectional".

In the case where "encryption-key-type="unidirectional", key generation and distribution is as described in U.S. patent application Ser. No. 13/754,866.

Since the encryption-key-type is set to "pairwise" for the node E1, in one embodiment, the node E1 is configured to generate a separate encryption key for each of the other nodes in the domain. All other nodes also generate an encryption key specifically for the node/edge E1. Pairwise key generation may include the following steps, in one embodiment:

(a) Configure encryption-key-type attribute to "pairwise" for the node E1:
   Interface ge0/0
   Tunnel-interface
      Encryption-key-type pairwise (b) The node E1 advertises its security parameters to the controller 104 over a secure channel 108. The controller 104 in turn advertises the security parameters for the node E1 to all other nodes. Each receiving node now knows that there needs to be a pairwise key for the node E1. This is known from the encryption-key-type attribute, which is set to pair-wise.

(c) The node E1, configured with pair-wise key attribute, generates a separate encryption key for each of the other nodes. For example the node E1 generates the following encryption keys to correspond with the values shown in the Table 200:
   a. key "k(a)" for the node E2 and advertises its TLOC with key "k(a)" to the node E2 via the controller 104
   b. key "k(b)" for the node E3 and advertises its TLOC with key "k(b)" to the node E3 via the controller 104
   c. key "k(c)" for the node E4 and advertises its TLOC with key "k(c)" to the node E4 via the controller 104

(d) Each of the other nodes generates a separate pair-wise encryption key for node E1. To accord with the values shown in the Table 200, the following keys are generated:
a. Node E2 generates encryption keys:
   a. key "k(x)" for node E1 and advertises its TLOC with key "k(x)" to the node E1 via the controller 104
   b. key "k2" for all other nodes and advertises its TLOC with key "k2" to all other nodes via the controller 104
b. Node E3 generates encryption keys:
   a. key "k(y)" for the node E1 and advertises its TLOC with key "k(y)" to node(1) via the central controller 104
   b. key "k3" for all other nodes and advertises its TLOC with key "k3" to all other nodes via the central controller 104
c. Node E4 generates encryption keys:
   a. key "k(z)" for node E1 and advertises its TLOC with key "k(z)" to the node E1 via the central controller 104
   b. key "k4" for all other nodes and advertises its TLOC with key "k4" to all other nodes via the central controller 104

Key Distribution:

The node E1 may be configured to advertise its TLOC with the following additional properties:
Dest system-ip: System-ip of intended receivers
Encryption-key-type: "pair-wise" or "unidirectional"

When a controller 104 receives a TLOC advertisement, it propagates it to other nodes based on the following criteria:
   If (dest system-ip=x.x.x.x) && (encryprion-key-attribute=="pair-wise")
      Send-it-to-node-with-system-ip=x.x.x.x
   If (dest system-ip="*") and (encryption-key-type="unidirectional)
      Send it to all nodes with TLOC with encryption type="unidirectional"

Key Refresh or Re-Key Mechanism:

A node configured with "pair-wise" encryption-key-type will have "n−1" number of encryption keys, where "n" is the number of nodes in the domain. "n" can potentially be a large number, greater than 1000 in some cases.

If the re-key interval is 't' seconds then it is not desirable to re-key all "n−1" keys at time 't' because this would result in a flood of TLOC advertisements every time interval 't'. Thus, in one embodiment rekeying is staggered over time. This may require maintaining a separate rekey timer for each TLOC or a group of TLOCS. Link state protocols, such as OSPF staggered refreshing of self-originated LSAs or a similar protocol may be used to implement rekeying.

Hash-Based Key Distribution:

In this method, each edge node generates a set of 'n' number of keys, where 'n' is greater than or at least equal to the number of nodes in the network, and distributes the keys to the central controller 104, in the manner described. The edge node also advertises a "hash algorithm" with the keys. The controller 104 may then be configured to apply the hash to select a key from the set for each node requiring a key. Each selected key is then sent to the correct node, in the manner described. The edge node that generated the set of keys may be configured to apply the same hash algorithm to identify the key that the controller 104 selected for each edge node.

In the case of the exemplary network 100, the node E1 is configured for pairwise keys. There are total of four nodes. Thus, for example, the node E1 can generate 100 keys and send those with together with a hash algorithm to the central controller 104. The controller 104 applies the hash algorithm and comes up with key k2 for the node E2, key k3 for the node E3 and key k4 for the node E4. The controller 104 assigns the key k2 to the node E2, the key k3 to the node E3,1 and the key k4 to the node E4. The node E1 on the other hand would have come up with the same key mappings because it used the same hash algorithm.

There is a chance that the hashing may yield the same key for multiple edge nodes. This is referred to as "key collision". If it happens then the controller 104 notifies the edge node E1 of the collision, in which case the node E1 can either generate a new hash algorithm or it can generate a set of keys again with a new hash algorithm, which is then advertised to the controller 104.

Key Management Optimization:

Every time a pairwise node reboots, it regenerates 'n' number of keys (n=number of nodes in the network). The controller 104 would then have to re-advertise the regenerated to all other nodes. If there are many pairwise nodes then each reboot/flap can result in a lot of keys advertised after each flap. To avoid sending new keys to 'n' number of nodes when a node, say the node E1, reboots the following key management optimization procedure may be executed:

a. The controller 104 detects loss of connectivity associated with node that went down (hereinafter "down node") and marks that node's reachability as stale.
b. The controller 104 keeps the keys associated with the down node, but marks them as stale
c. The controller 104 informs all other nodes that the down node is not reachable
d. In response, all other nodes keep the keys received from down node by mark them as stale
e. When the down node comes back up, the controller 104 notifies all other nodes of this fact so that the keys associated with the down node are no longer marked as stale.
f. The controller 104 may be configured to send the keys generated by the down node before it crashed back to said node.

Figure 3:
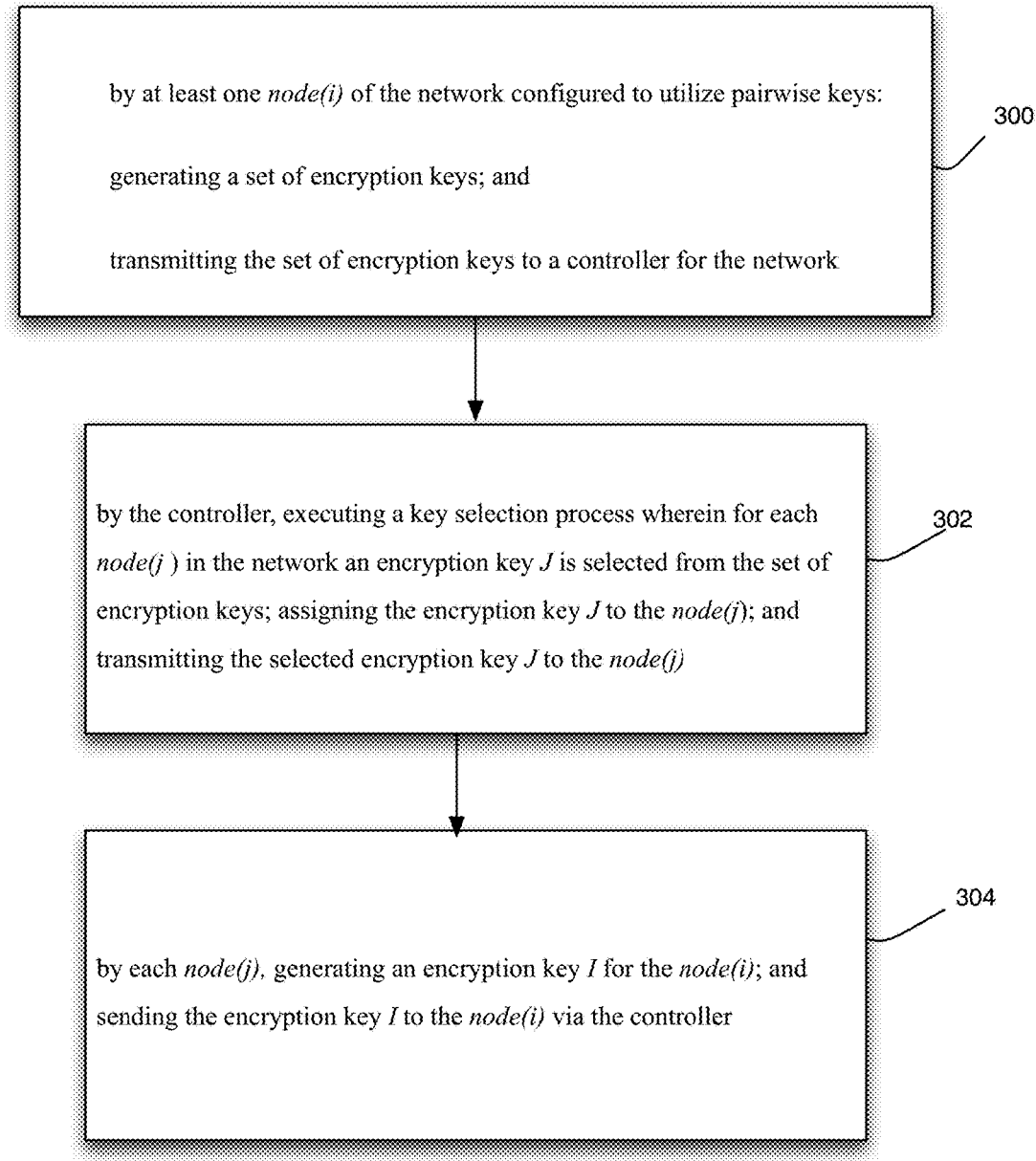
FIG. 3 shows the processing steps for generating and distributing pairwise keys in accordance with one embodiment of the invention.

A method for securing communications for a given network has been described. The method may comprise the steps 300 to 304 shown in the flowchart of FIG. 3.

On advantage of the techniques and systems disclosed herein is the pairwise keys may by dynamically be generated, distributed, and managed without use of the Internet Key Exchange Protocol (IKE).

Figure 4:
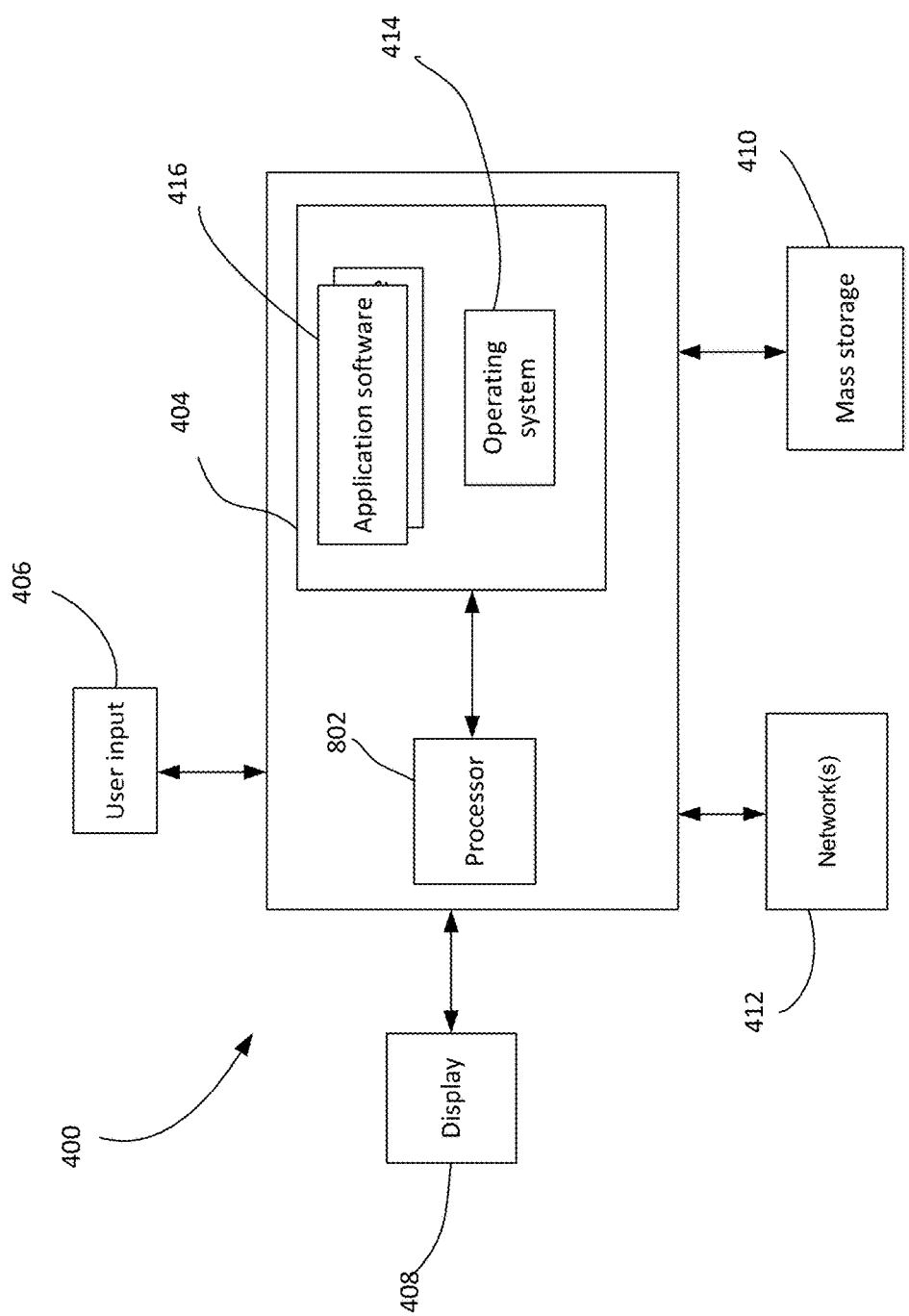
FIG. 4 shows a high-level block diagram for a controller and mapping server, in accordance with one embodiment of the invention.

FIG. 4 shows an example of hardware 400 that may be used to implement the controller 104 and the mapping server 106, in accordance with one embodiment. The hardware 400 may include at least one processor 402 coupled to a memory 404. The processor 402 may represent one or more processors (e.g., microprocessors), and the memory 404 may represent random access memory (RAM) devices comprising a main storage of the hardware, as well as any supplemental levels of memory e.g., cache memories, non-volatile or back-up memories (e.g. programmable or flash memories), read-only memories, etc. In addition, the memory 404 may be considered to include memory storage physically located elsewhere in the hardware, e.g. any cache memory in the processor 402, as well as any storage capacity used as a virtual memory, e.g., as stored on a mass storage device.

The hardware also typically receives a number of inputs and outputs for communicating information externally. For interface with a user or operator, the hardware may include one or more user input output devices 406 (e.g., a keyboard, mouse, etc.) and a display 408. For additional storage, the hardware 400 may also include one or more mass storage devices 410, e.g., a Universal Serial Bus (USB) or other removable disk drive, a hard disk drive, a Direct Access Storage Device (DASD), an optical drive (e.g. a Compact Disk (CD) drive, a Digital Versatile Disk (DVD) drive, etc.) and/or a USB drive, among others. Furthermore, the hardware may include an interface with one or more networks 412 (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces between the processor 412 and each of the components, as is well known in the art.

The hardware 400 operates under the control of an operating system 414, and executes application software 416 which includes various computer software applications, components, programs, objects, modules, etc. to perform the techniques described above.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, USB and other removable media, hard disk drives, optical disks (e.g., Compact Disk Read-Only Memory (CD ROMS), Digital Versatile Disks, (DVDs), etc.), flash drives among others.

Figure 5:
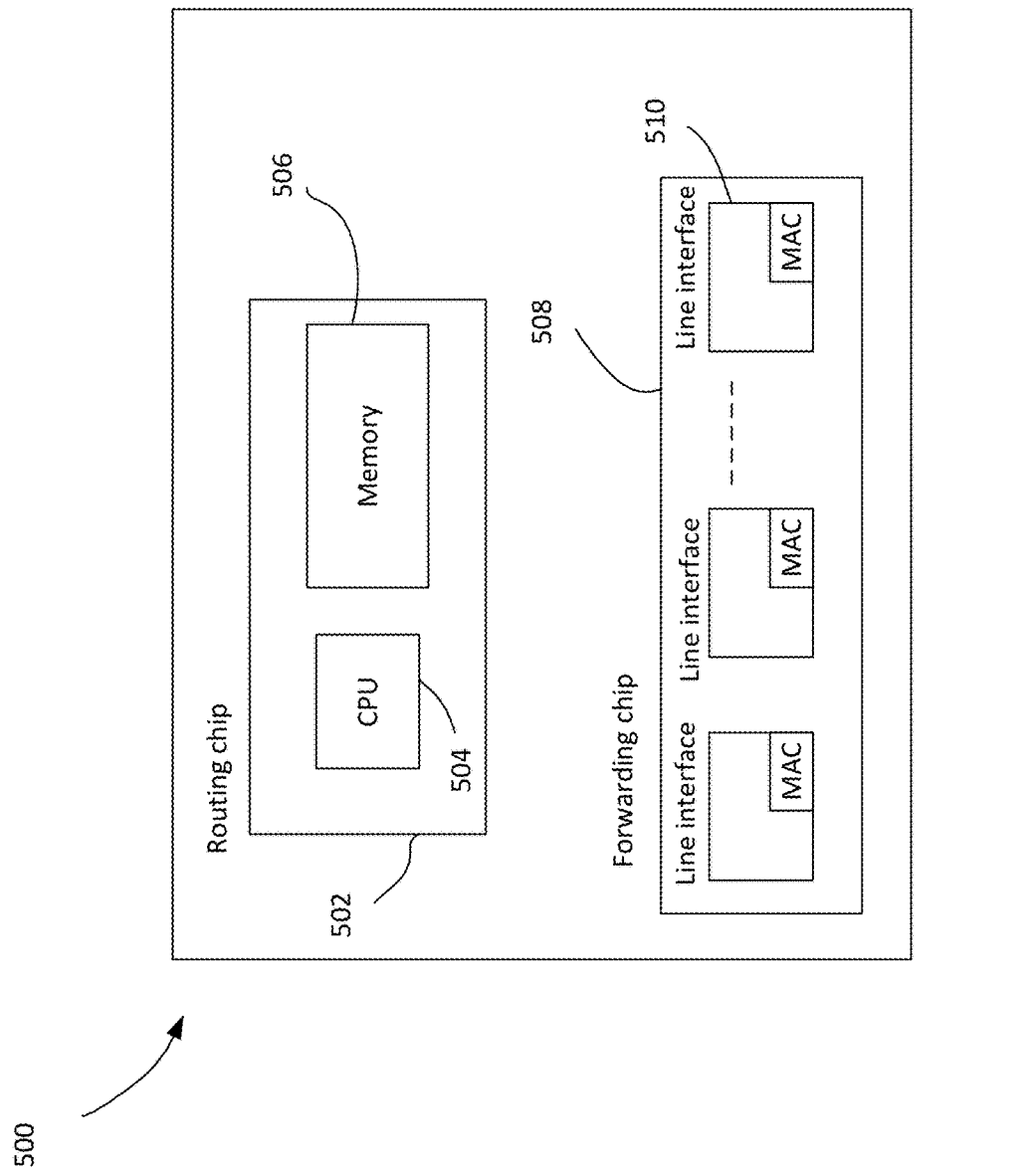
FIG. 5 shows a high-level block diagram of hardware for a router/endpoint, in accordance with one embodiment of the invention.

FIG. 5 shows a block diagram of hardware 500 for edge routers E1-En and ma described above, in accordance with one embodiment of the invention. Referring to FIG. 5, the hardware 750 includes a routing chip 504 coupled to a forwarding chip 508. The routing chip 504 performs functions such as path computations, routing table maintenance, and reachability propagation. Components of the routing chip include a CPU or processor 504, which is coupled to a memory 506. The memory stores instructions to perform the methods disclosed herein. The forwarding chip is responsible for packet forwarding along a plurality of line interfaces 510.

Although the present invention has been described with reference to specific exemplary embodiments, it will be evident that the various modification and changes can be made to these embodiments without departing from the broader spirit of the invention. Accordingly, the specification and drawings are to be regarded in an illustrative sense rather than in a restrictive sense.

The invention claimed is:

1. A method for securing communications in a network that includes a first node configured to utilize pairwise keys, a second node, and a controller between the first node and the second node, the method comprising:
    generating, by the first node, a set of pairwise encryption keys;
    transmitting, by the first node, the set of pairwise encryption keys to the controller for the network;
    indicating, by the first node, a key selection process to the controller;

executing, by the controller, the key selection process indicated by the first node to select an encryption key from the set of pairwise encryption keys wherein for the second node in the network with which the first node is configured to communicate using a pairwise communication scheme, the encryption key selected from the set of pairwise encryption keys is designated as a second node encryption key for use by the second node exclusively for communications between the first node and the second node in the network, the executing of the key selection process including executing a hash algorithm to select the second node encryption key from the set of pairwise encryption keys;

assigning, by the controller, the second node encryption key to the second node;

transmitting, by the controller, the second node encryption key to the second node;

generating, by the second node, a first node encryption key for use by the first node exclusively for communications between the first node and the second node; and sending, by the second node, the first node encryption key to the first node via the controller.

2. The method of claim 1, further comprising:
generating, by the first node, the hash algorithm; and
transmitting, by the first node, the hash algorithm to the controller.

3. The method of claim 1, wherein the second node encryption key assigned to the second node and the first node encryption key generated by the second node for the first node together form a pairwise key pair.

4. The method of claim 3, further comprising:
determining by the first node, each encryption key assigned by the controller to other nodes in the network for communications using pairwise keys of the set of pairwise encryption keys.

5. The method of claim 4, wherein the determining performed by the first node is based on the hash algorithm.

6. The method of claim 3, wherein for communications from the first node to the second node, the first node encrypts the communications using the first node encryption key generated by the second node.

7. The method of claim 3, wherein for communications from the second node to the first node, the second node encrypts the communications using the second node encryption key assigned to it by the controller.

8. The method of claim 1, further comprising:
notifying, via a notification generated by the controller, the first node if the second node encryption key is selected for two different nodes.

9. The method of claim 8, further comprising:
generating, by the first node in response to the notification, another hash algorithm for the controller, or a set of new keys and the another hash algorithm for the controller.

10. The method of claim 1, wherein a number of keys in the set of pairwise encryption keys is greater than a number nodes in the network.

11. A computer network comprising:
a first node configured to:
utilize pairwise keys for secure communications with other nodes in the network;
generate a set of pairwise encryption keys;
transmit the set of pairwise encryption keys to a controller for the network; and
indicate a key selection process to the controller; and
a plurality of other nodes, including a second node, with which the first node is configured to communicate using a pairwise communication scheme,
wherein,
the controller for the network is configured to:
execute the key selection process indicated by the first node to select an encryption key from the set of pairwise encryption keys for the second node, the encryption key selected from the set of pairwise encryption keys is designated as a second node encryption key for use by the second node exclusively for communications between the first node and the second node in the network, execution of the key selection process includes executing a hash algorithm to select the second node encryption key from the set of pairwise encryption keys;
assign the second node encryption key to the second node; and
transmit the second node encryption key to the second node;
the second node is configured to:
generate a first node encryption key for the first node; and
send the first node encryption key to the first node via the controller.

12. The computer network of claim 11, wherein the first node is further configured to:
generate the hash algorithm; and
transmit the hash algorithm to the controller.

13. The computer network of claim 11, wherein the second node encryption key assigned to the second node and the first node encryption key generated by the second node for the first node together form a pairwise key pair.

14. The computer network of claim 13, wherein the first node is further configured to determine each encryption key assigned by the controller to other nodes in the network for communications using pairwise keys of the set of pairwise encryption keys.

15. The computer network of claim 14, wherein determining performed by the first node is based on the hash algorithm.

16. The computer network of claim 13, wherein for communications from the first node to the second node, the first node is further configured to encrypt the communications using the first node encryption key generated by the second node.

17. The computer network of claim 13, wherein for communications from the second node to the first node, the second node is further configured to encrypt the communications using the second node encryption key assigned to it by the controller.

18. The computer network of claim 11, wherein the controller is further configured to notify the first node if the second node encryption key is selected for two different nodes.

* * * * *